E. F. STACY.
FISHERMAN'S NIPPERS.
No. 78,546.  Patented June 2, 1868.
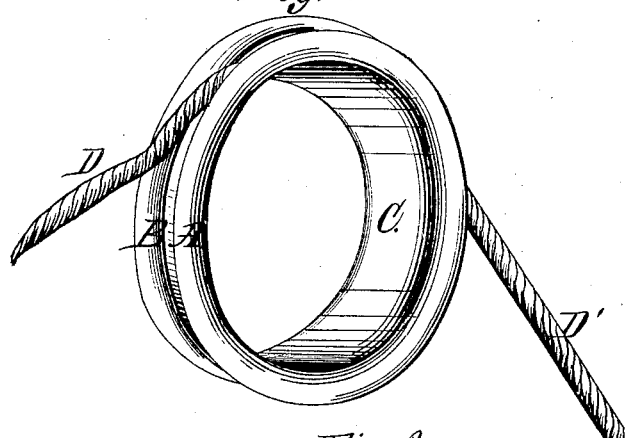
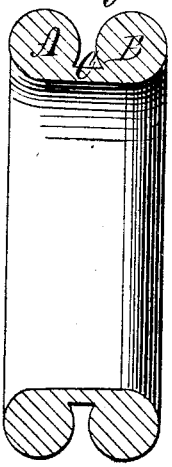

United States Patent Office.

ELI F. STACY, OF GLOUCESTER, MASSACHUSETTS.

Letters Patent No. 78,546, dated June 2, 1868.

FISHERMAN'S NIPPER.

*The Schedule referred to in these Letters Patent and making part of the same.*

TO ALL WHOM IT MAY CONCERN:

Be it known that I, ELI F. STACY, of Gloucester, in the county of Essex, and State of Massachusetts, have invented certain new and useful Improvements in Fishermen's "Nippers;" and I do hereby declare that the following is a full and exact description thereof, reference being had to the accompanying drawings, and to the letters of reference marked thereon.

To enable others skilled in the art to make and use my invention, I will proceed to describe its nature, construction, and use.

The nature of my invention consists in making, as a new article of manufacture, a fisherman's nipper, moulded from rubber, or a kindred elastic gum.

*Drawings.*

Figure 1 represents a perspective view of my nipper holding a line, D D'.

Figure 2 is a cross-section of the nipper.

My nipper is moulded in the form represented in the drawing, consisting essentially of two rings, A B, of about the diameter shown in the drawings, connected together by a short cylinder, C, the whole being quite elastic, so that when the line is placed between the rings A B, the pressure of the hand is sufficient to force the rings A B inward against the line, and to hold it firmly. By releasing the pressure the line is allowed to slip freely through.

This nipper is used by fishermen, and serves as a protection to their hands against the rubbing and cutting action of the lines, which would soon cause them to become so sore, without the use of it, that they could not continue their occupation without great discomfort.

Having thus described my invention, I will now proceed to set forth my claim.

What I claim as my invention, and desire to secure by Letters Patent of the United States, is—

As a new article of manufacture, a moulded elastic gum "nipper," as described, and for the purpose set forth.

ELI F. STACY.

Witnesses:
DAVID W. LOW,
FRANK G. PARKER.